(12) United States Patent
Pande (10) Patent No.: US 11,753,191 B1
(45) Date of Patent: Sep. 12, 2023

(54) METHOD OF PACKAGING A SOIL IN A PACKAGING APPARATUS

(71) Applicant: Ryan S. Pande, Broomfield, CO (US)

(72) Inventor: Ryan S. Pande, Broomfield, CO (US)

( * ) Notice: Subject to any disclaimer, the term of this patent is extended or adjusted under 35 U.S.C. 154(b) by 0 days.

(21) Appl. No.: 17/825,585

(22) Filed: May 26, 2022

(51) Int. Cl.
   *B65B 1/24* (2006.01)
   *B65B 7/28* (2006.01)

(52) U.S. Cl.
   CPC . *B65B 1/24* (2013.01); *B65B 7/28* (2013.01)

(58) Field of Classification Search
   CPC ..... B65B 1/24; B65B 1/28; A01C 21/00–007; A01G 9/02–0291; A01G 9/08–088
   See application file for complete search history.

(56) References Cited

U.S. PATENT DOCUMENTS

| | | | | |
|---|---|---|---|---|
| 1,664,913 A | * | 4/1928 | Bewley | A01G 9/081 141/73 |
| 3,657,839 A | * | 4/1972 | Krause | A01G 9/088 47/1.01 R |
| 3,659,380 A | * | 5/1972 | Mayer | A01G 9/081 47/1.01 R |
| 4,697,623 A | * | 10/1987 | Bouldin | A01G 9/081 141/98 |
| 8,590,583 B2 | * | 11/2013 | Ellis | A01G 9/081 141/129 |
| 2013/0318872 A1 | * | 12/2013 | van der Starre | A01G 9/02 47/81 |
| 2017/0086397 A1 | * | 3/2017 | Sutton | A01G 27/005 |
| 2020/0221649 A1 | * | 7/2020 | Hung | A01C 14/00 |

FOREIGN PATENT DOCUMENTS

| | | | | |
|---|---|---|---|---|
| KR | 20150130898 A | * | 11/2015 | |
| WO | WO-2020149735 A1 | * | 7/2020 | |
| WO | WO-2020175993 A1 | * | 9/2020 | |

OTHER PUBLICATIONS

Machine translation of KR-20150130898-A (Year: 2015).*

* cited by examiner

*Primary Examiner* — Anna K Kinsaul
*Assistant Examiner* — Himchan Song
(74) *Attorney, Agent, or Firm* — Hall Estill Law Firm; Bryan A. Fuller (57) ABSTRACT

A method of packaging a soil mixture in a packaging apparatus. The method includes adding the soil mixture inside the packaging apparatus. The method can also include the use of an outer sleeve and an inner sleeve to support the packaging apparatus as the soil mixture is packed therein. The method can also incorporate a press mold to compress the soil mixture in the packaging apparatus.

15 Claims, 9 Drawing Sheets

METHOD OF PACKAGING A SOIL IN A PACKAGING APPARATUS

STATEMENT REGARDING FEDERALLY SPONSORED RESEARCH OR DEVELOPMENT

Not applicable.

CROSS-REFERENCE TO RELATED APPLICATIONS

Not applicable.

BACKGROUND OF THE DISCLOSURE

1. Field of the Invention

The present disclosure relates to a soil treatment process to generate a soil that has been inoculated with microbes that are beneficial to plant growth and health. The present disclosure is also directed to a packaging apparatus and a method for packaging soil in the packaging apparatus.

2. Description of the Related Art

Typically, indoor agriculture/plants, such as cannabis, have fairly short growth time before they are harvested. This creates a unique problem. This reduces the chance that microbes could bloom and create a relationship with the plant because the indoor plants aren't in contact with the soil or substrate long enough. Microbial blooming can take about 6-8 weeks under perfect conditions and even longer in normal plant growing conditions. In large scale indoor cannabis grows, the plants are given about 8 weeks before they are harvested. Thus, the plant, at most, is at full efficiency for about 2 weeks, but more likely, the microbes never reach full efficiency (highest rate of nutrient exchange and protection).

Accordingly, there is a need for a soil treatment process to generate a soil that has been inoculated with microbes that are beneficial to plant growth and health. There is also a need for a packaging apparatus and a method for packaging soil in the packaging apparatus.

SUMMARY OF THE DISCLOSURE

The present disclosure is directed to a method of packaging a soil mixture in a packaging apparatus. The method includes adding the soil mixture inside the packaging apparatus. The method can also include the use of an outer sleeve and an inner sleeve to support the packaging apparatus as the soil mixture is packed therein. The method can also incorporate a press mold to compress the soil mixture in the packaging apparatus.

DETAILED DESCRIPTION OF THE DISCLOSURE

The present disclosure is directed to a soil treatment process to generate a treated soil that has been inoculated with microbes that are beneficial to plant growth and health. The soil treatment process generally includes preparing the soil to create a soil mixture that is to be treated, sterilizing the soil mixture, inoculating the soil mixture with a microbe broth and subjecting the soil mixture to an incubation process. The soil treatment process can also include processing the treated soil and packaging the treated soil. The present disclosure is also directed to a process of producing the microbe broth used in the soil treatment process.

Soil as used herein can be comprised of multiple components such as compost, sand, silt, minerals, organic matter, water, and gases. To prepare the soil to be sterilized and inoculated, the soil can be mixed with various components (e.g., substrates and additives) to create a soil mixture. The soil can include any components known in the art for enhancing a soil's ability to support plant growth. Examples of additives that can be included with the soil include, but are not limited to, kelp meal, neem cake, crab meal, basalt rock dust, oyster shell flour, gypsum, guano, grass clippings, bone dust, perlite, charcoal, blood meal, urea, rye, wheat, barley, rice flour and any other additive known to one of ordinary skill in the art to add to soil. Examples of substrates that can be added to the soil to create the soil mixture include, but are not limited to, coconut husk, coconut coir, peat moss, hemp fiber, pine needles, leaf-fall, paper, and any other substrate known to be added to soil to increase the soil mixture's growth support. The soil mixture can be made up in any type of container capable of handling the conditions present during the various phases of the soil treatment process.

In one embodiment of the present disclosure, the total soil mixture can include about 10% by volume to about 90% by volume of substrate. In a further embodiment, the total soil mixture can include about 25% by volume to about 75% by volume of substrate. In yet another embodiment, the total soil mixture can include about 45% by volume to about 50% by volume of substrate. In an even further embodiment, the total soil mixture can include about 50% by volume of substrate. In one embodiment, the soil mixture can include about 40 g to about 570 g of additives per cubic foot of total soil mixture. In another embodiment, the soil mixture can include about 570 g to about 1100 g of additives per cubic foot of total soil mixture. In yet another embodiment, the soil mixture can include about 1880 g to about 3000 g of additives per cubic foot of total soil mixture. Each individual additive can be present in the soil mixture in any amount such that the total amount of additives does not exceed a concentration of about 3000 g per cubic foot of soil mixture.

Once the soil mixture is prepared, the soil mixture is subjected to a sterilization process. Any methods of sterilizing soil known in the art can be used, so long as the soil is not exposed to temperatures in excess of the soil mixture's smoke point (typically around 350 degrees Fahrenheit). In one example, the sterilization process consists of covering the soil mixture in the container and heating the soil mixture at a heating temperature until the internal temperature of the soil mixture reaches a desired internal temperature. In one embodiment, the soil mixture can be heated in an oven to cause the soil mixture to reach the desired internal temperature. The heating temperature can range from about 180 degrees Fahrenheit to about 340 degrees Fahrenheit. In one embodiment of the present disclosure, the heating temperature is about 300 degrees Fahrenheit. Similarly, the desired internal temperature of the soil mixture is from about 180 degrees Fahrenheit to about 250 degrees Fahrenheit. In one embodiment, the desired internal temperature of the soil mixture is at least 200 degrees Fahrenheit.

After the soil mixture reaches the desired internal temperature, the soil mixture is loaded into an autoclave to subject the soil mixture to steam under pressure to kill harmful bacteria, viruses, fungi and spores, and to heat the soil mixture to a certain temperature for a specific amount of time. The temperature of the autoclave can be from about 250 degrees Fahrenheit to about 285 degrees Fahrenheit. In one embodiment, the autoclave can be set to about 250 degrees Fahrenheit. The autoclave can also be operated at about 16-35 psi. The specific amount of time the soil mixture can be subjected to the operation of the autoclave can range from about 30 minutes to about 12 hours. In one embodiment of the present disclosure, the soil mixture can be in the autoclave for at least 50 minutes. The soil mixture can also be subjected to a vacuum cycle prior to being subjected to the steam under pressure and the heating in the autoclave. The soil mixture can also be subjected to a vacuum cycle after the steam under pressure and the heating in the autoclave. It should be understood and appreciated that the vacuum cycles can occur in the autoclave. After all processes in the autoclave are complete, the soil mixture can be delivered to a clean room for cooling an inoculation. For the purposes of this disclosure, a clean room is an engineered space that maintains a very low concentration of airborne particulates. In one embodiment, the cleanroom is less than an ISO 8 on the cleanroom ISO scale.

Once the soil mixture is in the clean room, the soil mixture is allowed to cool to a certain temperature. The soil mixture is permitted to cool until the internal temperature of the soil mixture is in a range of 75 degrees Fahrenheit to about 90 degrees Fahrenheit. In one embodiment, the internal temperature is permitted to cool until the internal temperature of the soil mixture drops below 90 degrees Fahrenheit. After the internal temperature reaches the desired temperature, the container the soil mixture can be opened and the soil mixture sprayed with a microbe broth and potential other microbe cultures.

After the microbe broth is applied to the soil mixture, the soil mixture can be distributed to an incubation room. The incubation room has minimal lighting and high air circulation. The incubation room is also kept at a temperature between about 70 degrees Fahrenheit and about 90 degrees Fahrenheit. In one embodiment, the temperature of the incubation room is set to about 80 degrees Fahrenheit. The incubation room can also have a desired humidity that is maintained between about 75% and 100%. In another embodiment, the incubation room can have a desired humidity that is maintained between about 80% and 90%. The soil mixture can also be left in the incubation room for a certain amount of time to make sure the soil mixture has optimized its ability to support plant growth. In one embodiment of the present disclosure, the incubation period is greater than about six (6) weeks. In another embodiment, the incubation period is greater than about eight (8) weeks. In yet another embodiment, the incubation period is greater than about ten (10) weeks. After the incubation period, the treated soil mixture, if made up in separate containers, can be put into a hopper to thoroughly mixed. In a further embodiment of the present disclosure, the soil mixture can have additional tissue broth (disclosed herein) applied thereto after the microbe broth. The application of the additional tissue broth can be done while the soil mixture is being mixed. Desired amounts of the treated soil mixture can then be captured for distribution and/or packaging.

The microbe broth is comprised of a bacteria broth and/or a fungal broth and a tissue broth. The bacteria broth and/or the fungal broth can be combined with the tissue broth to make the microbe broth. The bacteria broth can include at least one *Bacillus* species of bacteria and the fungal broth can include at least one *Trichoderma* species of fungi. In a further embodiment of the present disclosure, the bacteria broth can include multiple *Bacillus* species of bacteria. Examples of *Bacillus* species include, but are not limited to, *Bacillus subtillus*, *Bacillus licheniformis*, *Bacillus megaterium*, and *Bacillus pumilus*. In yet another embodiment of the present disclosure, the bacteria broth includes the *Bacillus subtillus*, *Bacillus licheniformis*, *Bacillus megaterium*, and *Bacillus pumilus Bacillus* species. In another embodiment of the present disclosure, the fungal broth can include multiple *Trichoderma* species of fungi. Examples of *Trichoderma* species include, but are not limited to, *Trichoderma harzianum* and *Trichoderma viride*. In yet another embodiment of the present disclosure, the fungal broth can include the *Trichoderma harzianum* and *Trichoderma viride* species.

The tissue broth of the microbe broth can be made from transformed root cultures (TRC), which uses sacrificial root systems to propagate microbes that cannot be grown under normal in vitro environments. The tissue broth can include at least one *Rhizophagus* species of fungi. The *Rhizophagus* species of fungi can be generated by growing small seeds of lettuce on individual glass petri dishes. Once germination of the seeds occur, the seeds are sprayed with freeze dried *Rhizophagus* cultures. The new roots can also be supplied with a small amount of existing TRC to continually expanc the *Rhizophagus* TRC inventory. The plants are left to grow for a predetermined amount of time before being used in the tissue broth. When a new tissue broth is needed for inoculation, 1-10 g of root will be cut away from the existing TRC. The plants can be grown in the clean room for at least two (2) weeks. A portion of the root of the plant that is grown can be cut off to be ground up and mixed with water, or ground with water, to make the tissue broth. In a further embodiment of the present disclosure, the tissue broth can include multiple *Rhizophagus* species of fungi. Examples of *Rhizophagus* species include, but are not limited to, *Rhizophagus intradices*, *Rhizophagus mosseae*, *Rhizophagus etunicatum*, and *Rhizophagus aggregatum*. In yet another embodiment of the present disclosure, the tissue broth includes the *Rhizophagus intradices*, *Rhizophagus mosseae*, *Rhizophagus etunicatum*, and *Rhizophagus aggregatum* species.

The *Bacillus* bacteria species and the *Trichoderma* fungi species culture samples are added to their own nutrient broth [each nutrient broth has a concentration of about 3 g nutrient-broth-powder to 100 ml of water (distilled water, ionized water, reverse osmosis water, or type I-III water)]. In one embodiment, the bacteria broth can include nutrient powder in a range of about 1 g per 100 ml of water to about 4 g per 100 ml of water. Nutrient broth powder can contain various additional ingredients such as meat extract, peptone, yeast extract, corn extract, wheat extract, soy extract, potato extract, starch, glucose, sucrose, dextrose, agar-agar, and sodium chloride. In another embodiment, the bacteria broth can include between about 100,000 CFU/ml to about $10^9$ CFU/ml (colony-forming unit per milliliter) of a species of *Bacillus* bacteria (or a combination of *Bacillus* bacteria species). The fungal broth can include *Trichoderma* fungi (or a combination of *Trichoderma* fungi species) in a range of from about 100,000 CFU/ml to about $10^{10}$ CFU/ml.

Similar to the *Bacillus* species of bacteria and the *Trichoderma* species of fungi, the tissue broth can include water and a species of *Rhizophagus* fungi (or a combination of *Rhizophagus* fungi species). In one embodiment, the tissue broth can include from about 1 g to about 4 g of a species of *Rhizophagus* fungi (or a combination of *Rhizophagus* fungi species) per 100 ml of water.

After the bacteria broth is made (i.e., inoculated with one or more *Bacillus* species bacteria), the bacteria broth is placed in an incubator at a desired temperature to promote colonization. The temperature of the incubator can be any temperature such that colonization can occur. In one embodiment, the temperature of the incubator for the bacteria broth can be about 85 degrees to about 95 degrees Fahrenheit. Similarly, the fungal broth is placed in an incubator at a desired temperature to promote colonization after the second nutrient broth is made. The temperature of the incubator can be any temperature such that colonization can occur. In one embodiment, the temperature of the incubator for the second nutrient broth can be about 65 degrees to about 85 degrees Fahrenheit. Once colonization occurs, the bacteria broth and the fungal broth can be placed in a refrigerator or freezer to stunt any further colonization. When time to inoculate the soil mixture, the bacteria broth and/or the fungal broth and the tissue broth are mixed to make the microbe broth and the microbe broth is applied to the soil mixture. In one embodiment, the total microbe broth that is applied to the soil mixture is about 55 ml to about 200 ml per cubic foot of total soil mixture. In another embodiment, the total microbe broth that is applied to the soil mixture is about 200 ml to about 420 ml per cubic foot of total soil mixture. In a further embodiment, the total microbe broth that is applied to the soil mixture is about 200 ml per cubic foot of total soil mixture.

Figure 1:
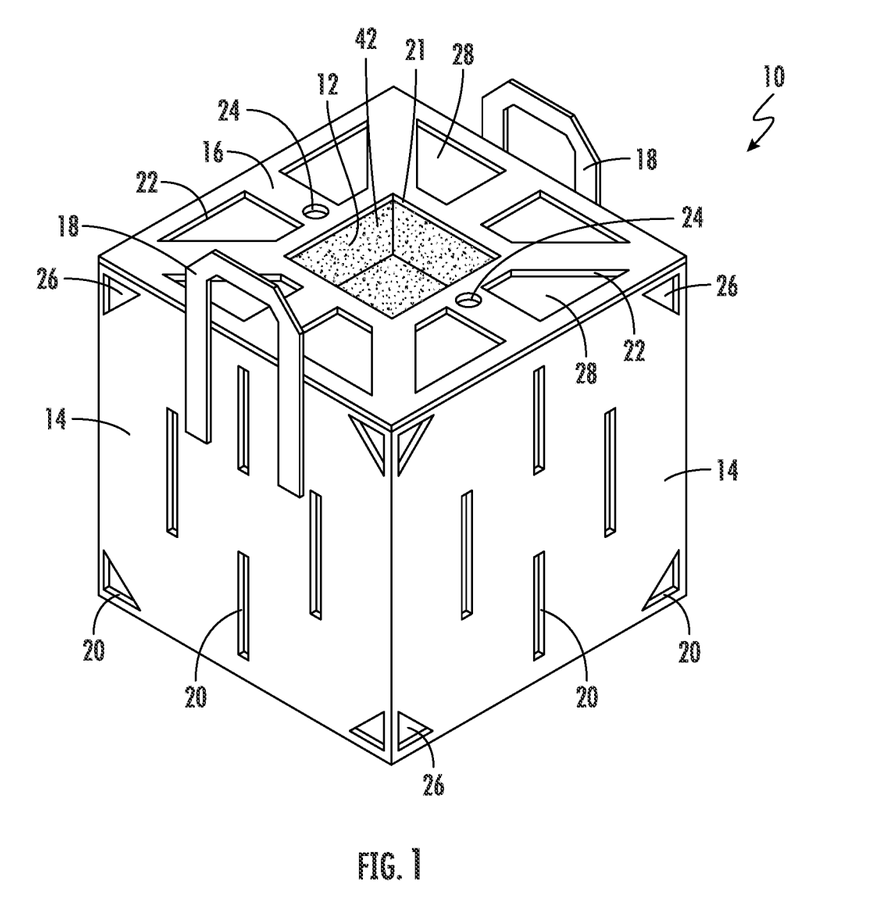
FIG. 1 is a perspective view of a soil packaging apparatus constructed in accordance with the present disclosure.

The present disclosure is also directed a packaging apparatus and a method for packaging soil in the packaging apparatus. Referring now to FIG. 1, shown therein is a packaging apparatus 10 for containing a soil mixture 12. The packaging apparatus 10 is designed such that a plant or seed can be planted in the soil mixture 12 in the packaging apparatus 10. The packaging apparatus 10 can include a base portion (not shown) with a plurality of sidewalls 14 extending upward therefrom to create a containment area. The packaging apparatus 10 can also include a lid 16 supported by at least one of the sidewalls 14. In one embodiment, the lid 16 can be hingedly attached to one of the sidewalls 14. The packaging apparatus 10 can have handles 18 attached thereto to facilitate moving and carrying the packaging apparatus 10. The handles 18 can be attached to any part of the packaging apparatus 10 such that the packaging apparatus 10 can be carried and moved as desired, such as attached to the sidewalls 14. The sidewalls 14 and lid 16 can be made of any material desirable, such as chipboard.

The sidewalls 14 can have openings 20 disposed therein to permit water to drain from the packaging apparatus 10. The base portion can also include openings disposed therein to permit drainage as well. The openings 20 can be any shape and size desired as long as the stability of the sidewalls 14 is not compromised. Furthermore, the openings 20 can be disposed in any part of each sidewall 14 such that drainage occurs at the desired locations in the sidewalls 14. In one embodiment, there can be openings 20 disposed in the corners of the sidewalls 14. In a further embodiment, some of the openings 20 are longitudinally disposed slots. The lid 16 can include a primary opening 21 disposed therein to permit a seed or plant to be planted in the soil mixture 12 in the packaging apparatus 10. The lid 16 can also include openings 22 disposed therein to permit water to be added to the soil mixture 12 by spraying the packaging apparatus 10. The lid 16 can also include irrigation ports 24 that would permit a water distributor, such as a hose, to be fed therein to supply the soil mixture 12 with water. The openings 22 can be any shape and size desired as long as the stability of the lid 16 is not compromised. Furthermore, the openings 22 can be disposed in any part of the lid 16 such that water can be supplied at the desired locations in the lid 16.

The packaging apparatus 10 can also include a layer of semi-permeable material 26 disposed on the inside of the sidewalls 14 to prevent bacteria and viruses from getting to the soil mixture 12, but still permit water to drain therefrom. The packaging apparatus 10 can also include a layer of semi-permeable material 28 disposed on the inside of the lid 16 to prevent bacteria and viruses from getting to the soil mixture 12 but still permits water to get to the soil mixture 12. The semi-permeable layer of materials 26 and/or 28 can be secured to the sidewalls 14 of the packaging apparatus 10 in any manner known in the art, such as via an adhesive. The packaging apparatus 10 can be any size and hold any amount of soil mixture 12 desired for a particular harvesting/planting operation.

Figure 2A:
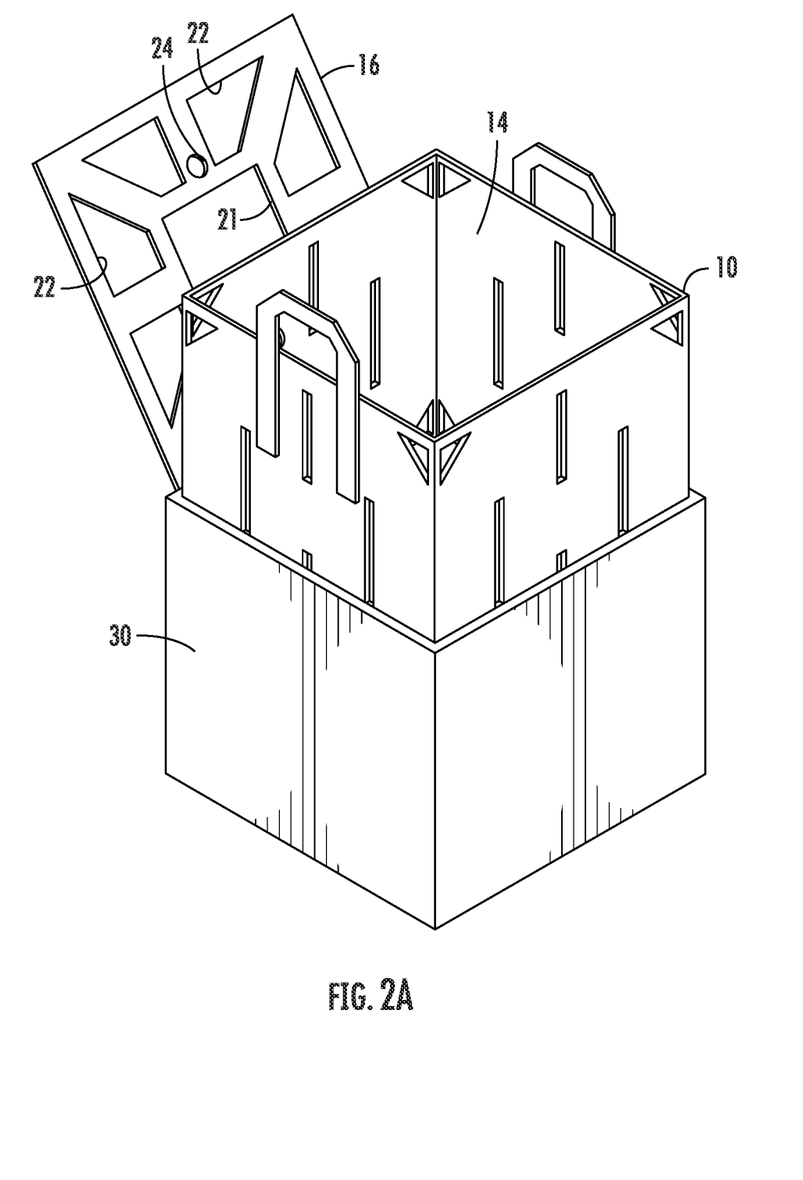
FIG. 2A-2G are perspective views of the soil packaging apparatus at various stages of a soil packing process depicted in accordance with the present disclosure.
Figure 2B:
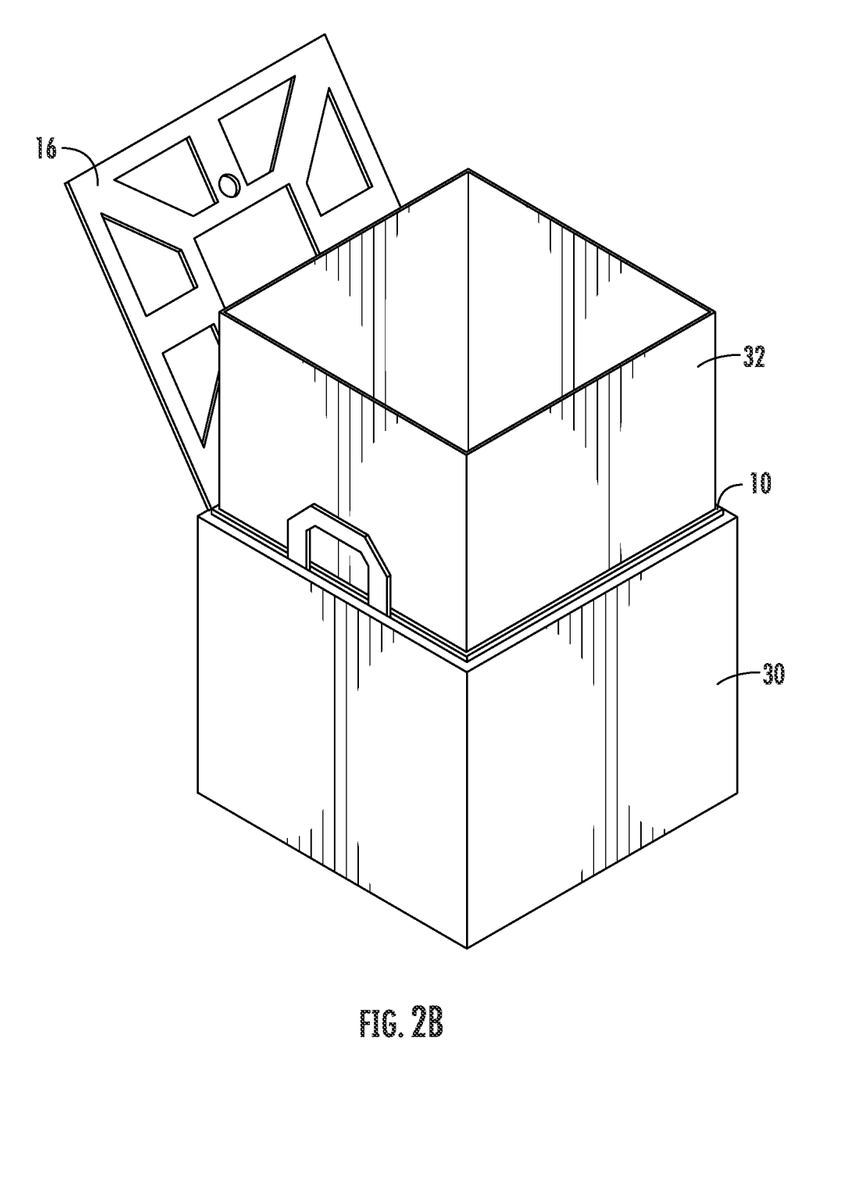

As stated herein, the present disclosure is also directed to the method of packing the soil mixture 12 into the packaging apparatus 10. FIGS. 2A-2G show an exemplary process of packing the soil mixture 12 in the packaging apparatus 10. FIG. 2A shows the packaging apparatus 10 with an outer sleeve 30 for supporting the packaging apparatus 10 during the process of packing the soil mixture 12 into the packaging apparatus 10. The outer sleeve 30 is designed to allow the packaging apparatus 10 to fit therein. In some embodiments, the outer sleeve 30 can include a base portion (not shown) for situation where the packing of the packaging apparatus 10 occurs on a surface that is not solid and the base of the packaging apparatus 10 is not properly supported. FIG. 2B shows the packaging apparatus 10 with an inner sleeve 32 being slid into the packaging apparatus 10. The inner sleeve 32 is slid down into the packaging apparatus 10 to prevent soil mixture 12 from being forced into and through the semi permeable membrane 26 and the openings 20 in the sidewalls 14 of the packaging apparatus 10. It should be understood that the semi permeable membrane 26 can be placed into the packaging apparatus 10 prior to the inner sleeve 32 being placed into the packaging apparatus 10.

Figure 2C:
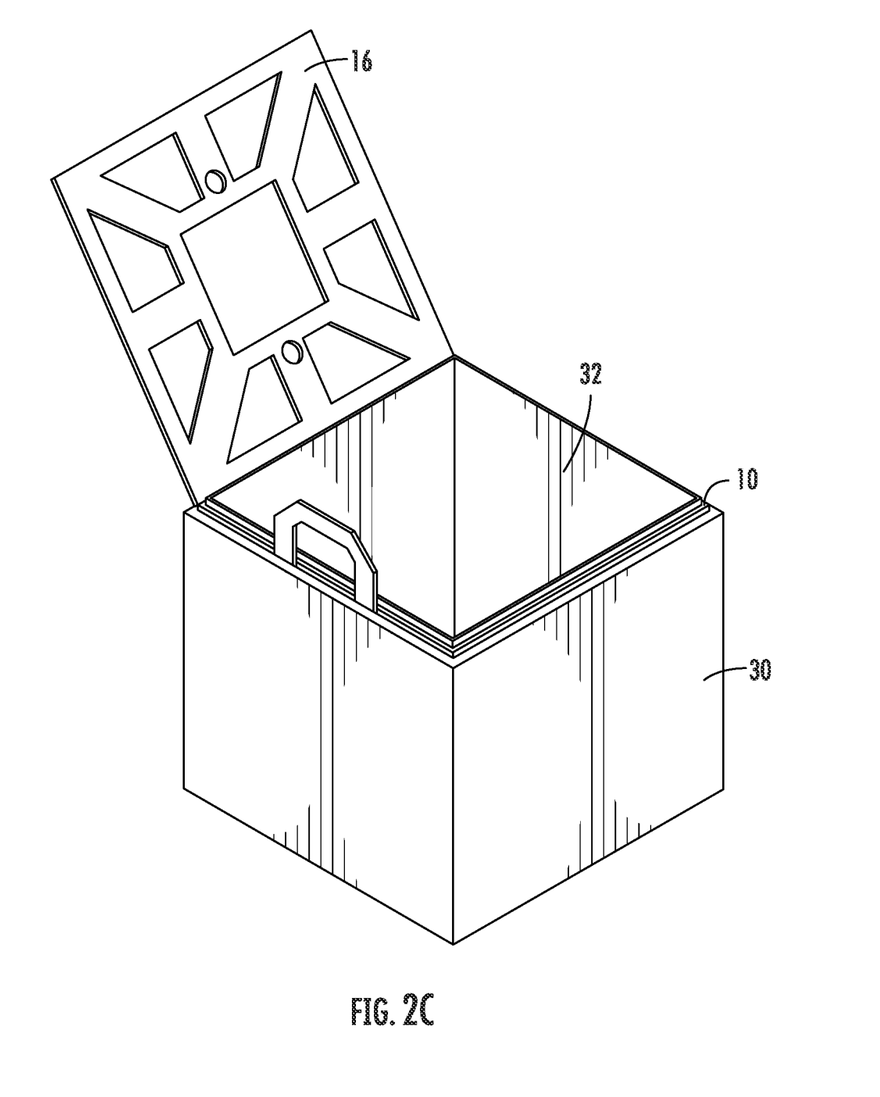
Figure 2D:
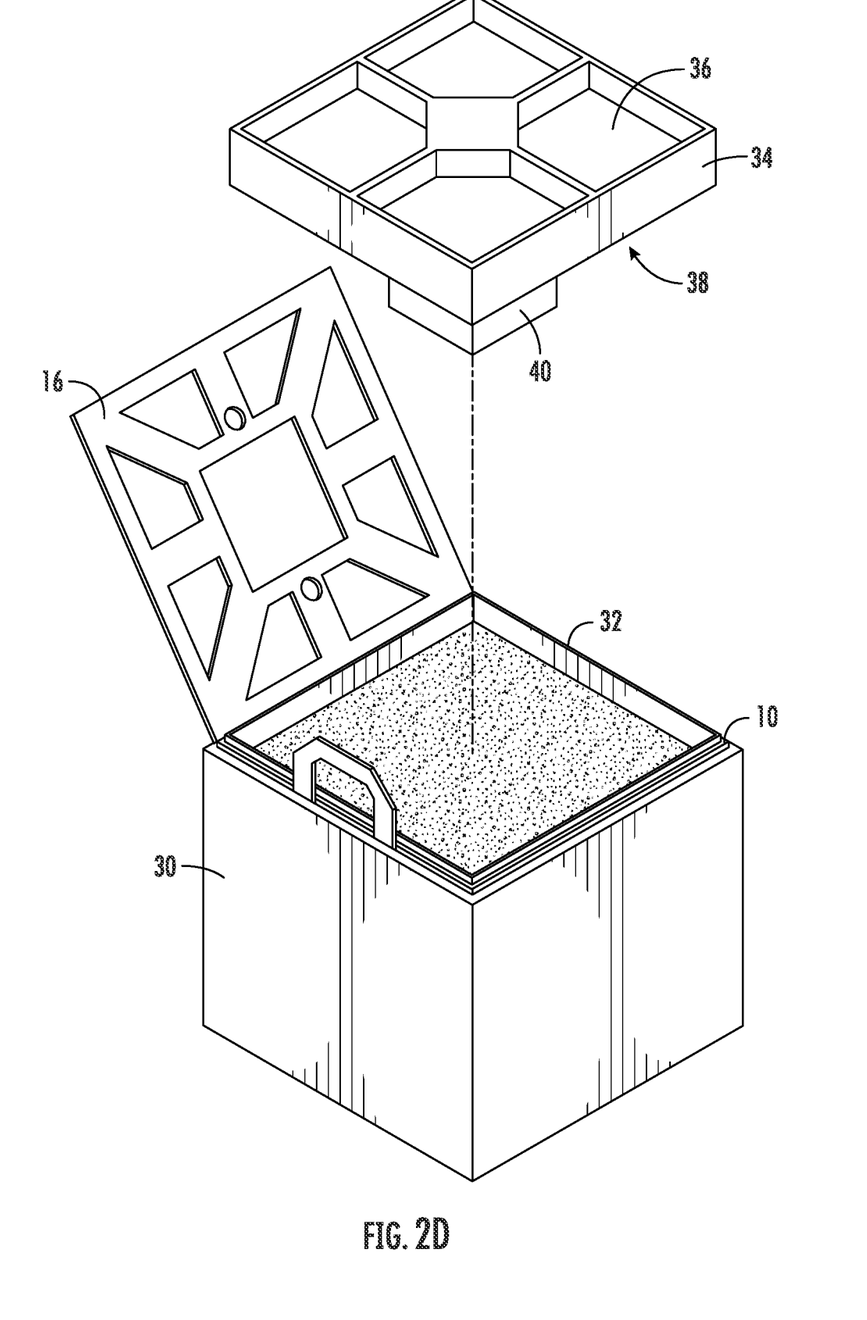
Figure 2E:
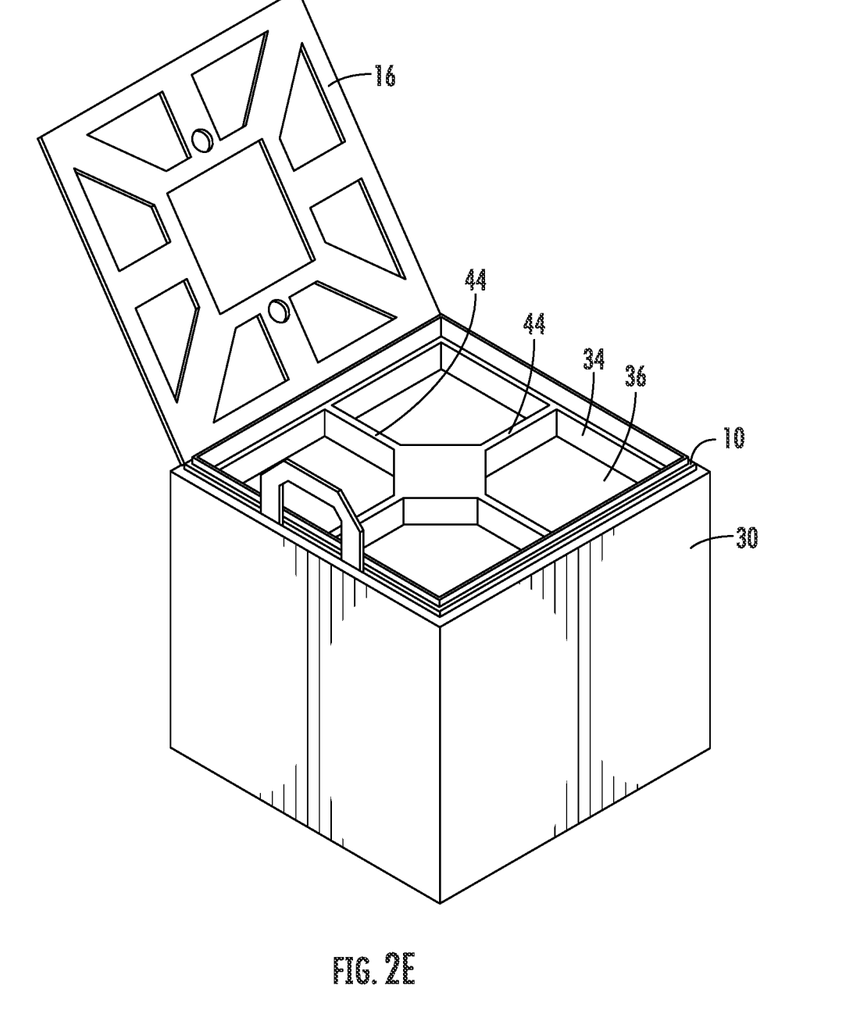

After the internal and external sleeves 30 and 32 are positioned as described herein, the soil mixture 12 can be placed inside the internal sleeve 14 within the packaging apparatus 10. The amount of soil mixture 12 placed inside the internal sleeve 32 depends upon the desired amount of soil mixture for the packaging apparatus 10. FIG. 2C shows the packaging apparatus 10 disposed within the external sleeve 30 and the internal sleeve 32 disposed within the packaging apparatus 10 and the soil mixture disposed within the internal sleeve 32. A press mold 34, shown in FIGS. 2D-2F and 3, can then be placed on top of the soil mixture 12 and inside the internal sleeve 32. The press mold 34 can be forced downward inside the internal sleeve 32 until the predetermined amount of soil mixture is compressed to a desired position in the packaging apparatus 10. The press mold 34 includes a top side 36 and a bottom side 38. The bottom side 38 can have any shape desirable so as to create any desired impression/depression in the soil mixture 12 in the packaging apparatus 10. The bottom side 38 of the press mold 34 can have a protrusion 40 having any shape to create a cavity 42 in the soil mixture 12 for accepting a seed or plant. For example, the protrusion 40 can be square shaped, rectangular shaped, bulbous, etc. The top side 36 of the press mold 34 can have any desired shape such that the press mold 34 can handle the stresses applied to it when compressing the soil mixture 12. The top side 36 of the press mold 34 can include support ridges 44 build thereon to provide stability to the press mold 34 during its use.

Figure 2F:
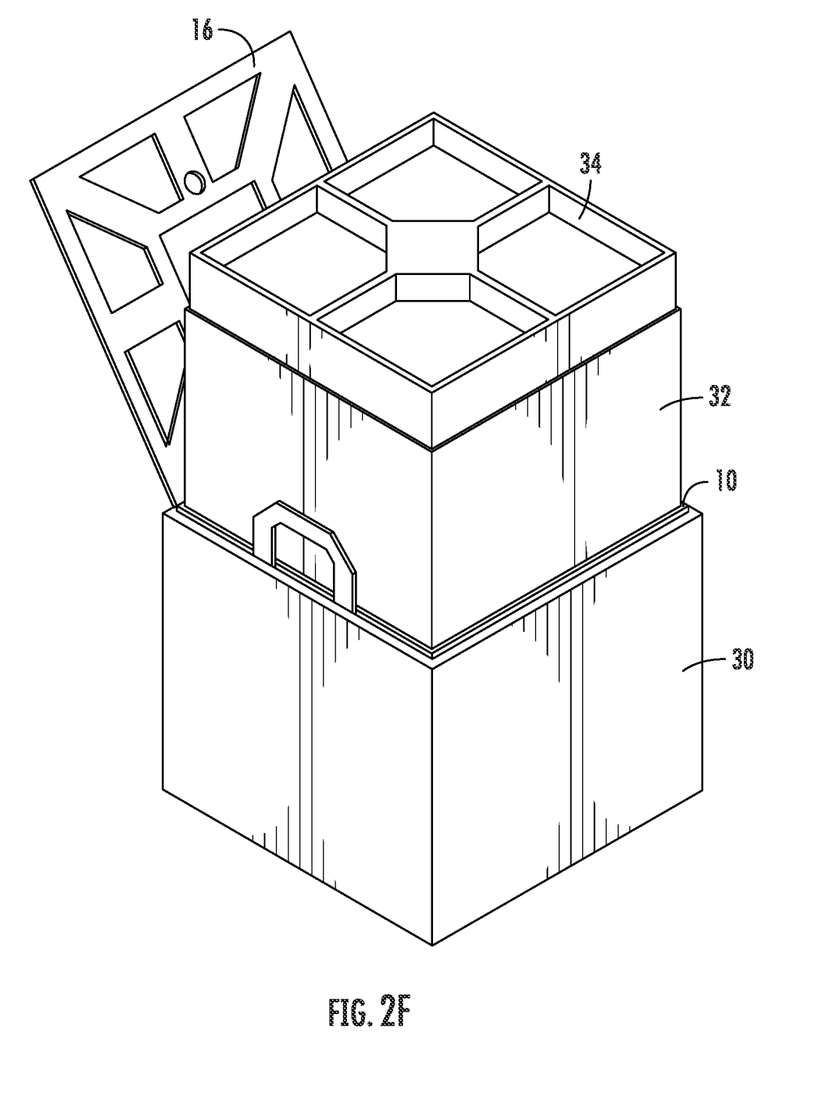
Figure 2G:
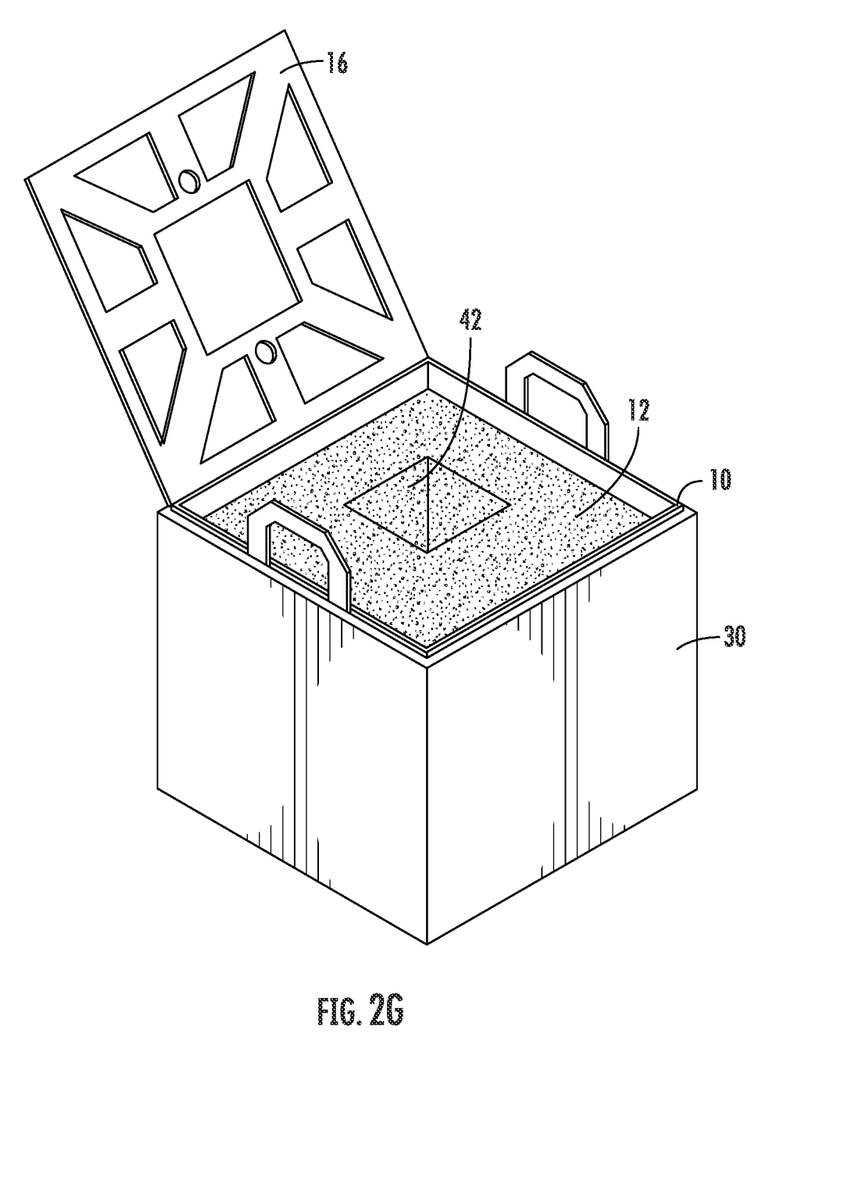
Figure 3:
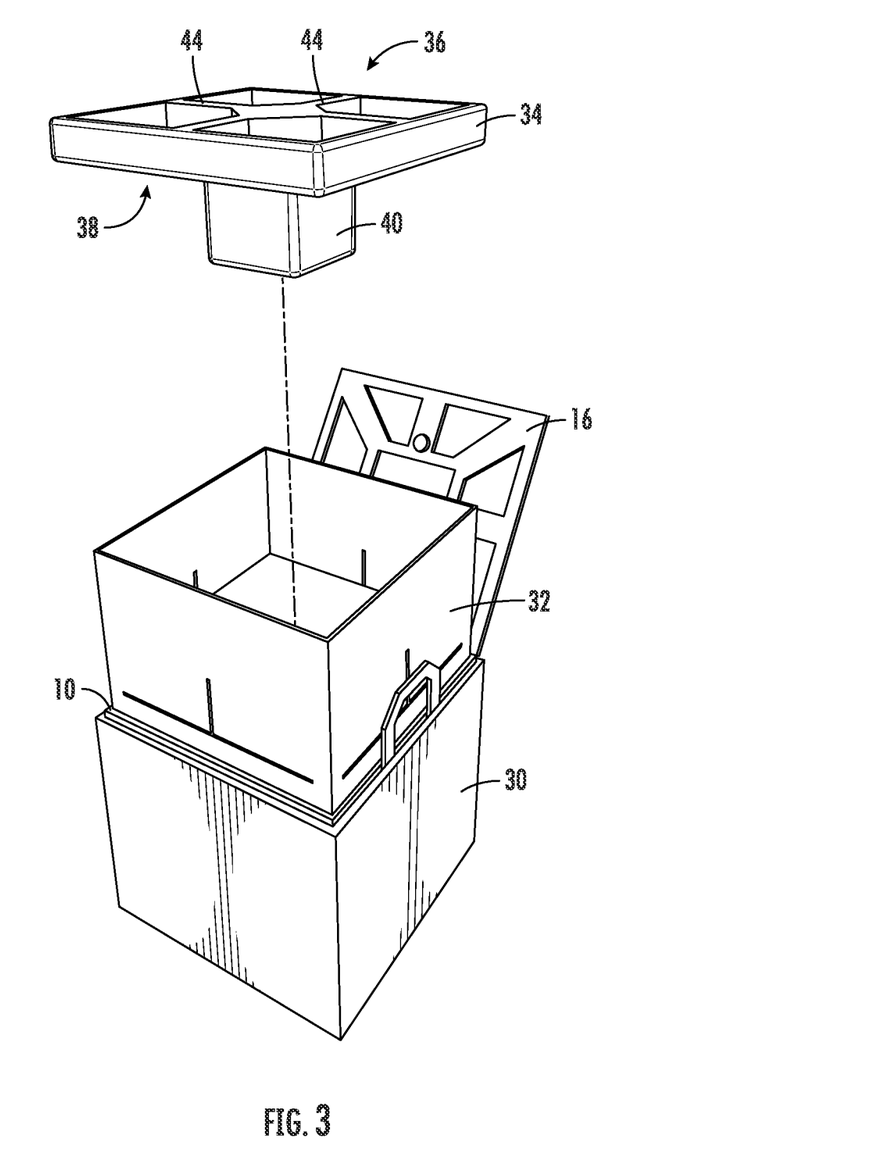
FIG. 3 is a perspective view of a press mold used in the soil packing process and constructed in accordance with the present disclosure.

After the soil mixture 12 has been compressed the desired amount by the press mold 34, the press mold 34 can be withdrawn from inside the internal sleeve 32 and from atop the soil mixture 12 as can be seen in FIG. 2F. The internal sleeve 32 can be withdrawn from the packaging apparatus 10 leaving the compressed soil mixture 12 in the packaging apparatus 10. The packaging apparatus 10 with the soil mixture 12 disposed therein can also be removed from the external sleeve 30. The packaging apparatus 10 can then be provided to harvesters to plant plants or seeds directly into the soil mixture 12 in the packaging apparatus 10. The packaging apparatus 10 can have any desired size relative to the size of plant being harvested in the packaging apparatus 10 (i.e., larger plants with a larger root system will require a larger packaging apparatus 10).

From the above description, it is clear that the present disclosure is well-adapted to carry out the objectives and to attain the advantages mentioned herein as well as those inherent in the disclosure. While presently preferred embodiments have been described herein, it will be understood that numerous changes and combinations may be made which will readily suggest themselves to those skilled in the art and which are accomplished within the spirit of the disclosure and claims.

What is claimed is:

1. A method of packaging a soil mixture in a packaging apparatus, the method comprising:
   adding the soil mixture inside the packaging apparatus;
   positioning the packaging apparatus in an outer sleeve prior to adding the soil mixture, the outer sleeve extending entirely around the packaging apparatus, the packaging apparatus having an inner side; and
   sliding an inner sleeve into the packaging apparatus before adding the soil mixture therein wherein the inner sleeve extends substantially an entire depth of the packaging apparatus and is disposed adjacent to the inner side of the packaging apparatus.

2. The method of claim 1 further including compressing the soil mixture into the packaging apparatus.

3. The method claim 2 wherein soil mixture is compressed with a press mold having a desired shape on a bottom side to create a desired shape of a top side of the soil mixture.

4. The method of claim 3 wherein the press mold can have support ridges disposed on a top side of the press mold to increase the stability of the press mold.

5. The method of claim 3 wherein the press mold has a protrusion on the bottom side to create a cavity in the top side of the soil mixture.

6. The method of claim 1 further comprising placing a semi-permeable membrane on an inner side of sidewalls of the packaging apparatus prior to putting the soil mixture into the packaging apparatus.

7. The method of claim 1 wherein the packaging apparatus has a plurality of sidewalls with various openings disposed in each sidewall to permit water to flow out.

8. The method of claim 1 wherein the packaging apparatus includes a lid.

9. The method of claim 8 wherein the lid includes a primary opening for receiving a plant or seed to be grown in the soil mixture.

10. The method of claim 9 wherein the lid further comprises at least one irrigation port disposed therein to permit a water delivery device to fit therethrough and provide water to the soil mixture.

11. The method of claim 1 further comprising withdrawing the inner sleeve from the packaging apparatus.

12. The method of claim 1 further comprising removing the packaging apparatus from the outer sleeve wherein the packaging apparatus includes the soil mixture therein.

13. The method of claim 1 further comprising withdrawing the inner sleeve from the packaging apparatus after the soil mixture has been added to the packaging apparatus.

14. The method of claim 1 further including compressing the soil mixture within the inner sleeve that is disposed in the packaging apparatus.

15. The method of claim 1 further comprising placing a semi-permeable membrane on an inner side of sidewalls of the packaging apparatus prior to inserting the inner sleeve into the packaging apparatus.

* * * * *